Figure 1:
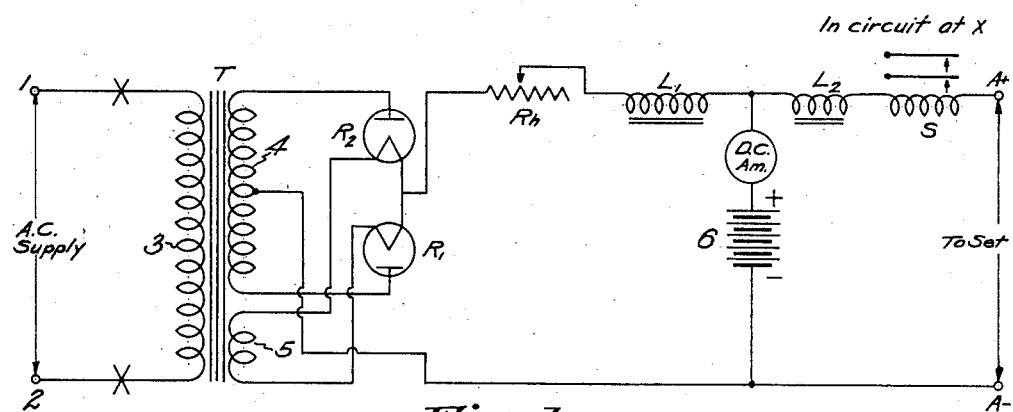

May 26, 1931. C. A. WRIGHT 1,807,331
BATTERY CHARGING UNIT
Filed Nov. 8, 1927

Inventor:
Charles A. Wright,
By Byrnes Townsend & Brickenstein
Attorneys

Patented May 26, 1931

1,807,331

UNITED STATES PATENT OFFICE

CHARLES A. WRIGHT, OF LAKEWOOD, OHIO, ASSIGNOR TO NATIONAL CARBON COMPANY, A CORPORATION OF NEW YORK

BATTERY CHARGING UNIT

Application filed November 8, 1927. Serial No. 231,933.

This invention relates to a battery charging system, and in particular to a battery charging system of a type which is especially adapted for use in charging dry cells. It may be applied to the charging of various types of dry cell, for example ignition cells, flashlight cells, and others, but the invention will here be more particularly described as being applied to a charging system for "A" or "B"-batteries of the kind suitable for use in radio receiving sets. Although this constitutes only one application of the invention, it is well calculated to illustrate the several phases thereof, and the necessary arrangements for applying it to other forms of dry cells will be obvious.

It has now been discovered that dry cells are capable of being charged in such a way as greatly to prolong their life. This, however, must be done in a particular manner, and the charging conditions must be carefully regulated. As is fully described and claimed in the copending application of George C. Furness, Ser. No. 124,534, filed July 23, 1926, the dry cells must not be allowed to approach a discharged condition, but must be subjected to charging in repeated alternation with their discharge periods. Moreover the charging current must be so regulated as to maintain the battery voltage within relatively narrow limits, and should be sufficient to keep the battery in a substantially charged condition, but insufficient to produce destructive effects. When dry cells are subjected to charging in this manner it is a fact peculiar to their nature that substantial overcharge is likely to prove injurious or even destructive. A secondary battery, such as an ordinary lead storage cell, may ordinarily be subjected to a moderate degree of overcharge without undergoing serious injury, since the battery merely "gases". With regard to dry cells, however, it is a fact peculiar to their nature that they cannot undergo a substantial overcharge, even at a low or normal rate, without being injured through drying out due to flow of the electrolyte from the paste into the mix, consequent dessication of the paste layer, and development of a high resistance at this point. This phenomenon should be distinguished from the general and heretofore understood drying out of the entire dry cell, the phenomenon now referred to being a specific redistribution of moisture as between the lining of the cell and the mix. This lining dessication phenomenon presents a problem peculiar to dry cells, the true nature of the problem having been only recently discovered. My present invention is directed to a battery charging system especially adapted for use in charging dry cells, and intended particularly, among other things, to overcome the foregoing difficulties.

I have found that by designing and proportioning a transformer to operate at or above its saturation point, and by combining the transformer with other elements to produce a charging system for dry cells, as will be hereafter described, I may produce a dry cell charging system which is peculiarly suited to its particular objects, and which successfully operates to limit or prevent overcharge of the dry cells, while at the same time maintaining them in a substantially charged condition. According to my invention I arrange a transformer which is adapted for connection to any desired alternating current source in combination with a rectifying device, a dry cell or group of cells to be charged, a filter if desired, and a switch or relay if desired, and I design and proportion the transformer so that it operates at or above its point of saturation under the load conditions existing in the circuit which it supplies.

Figure 2:
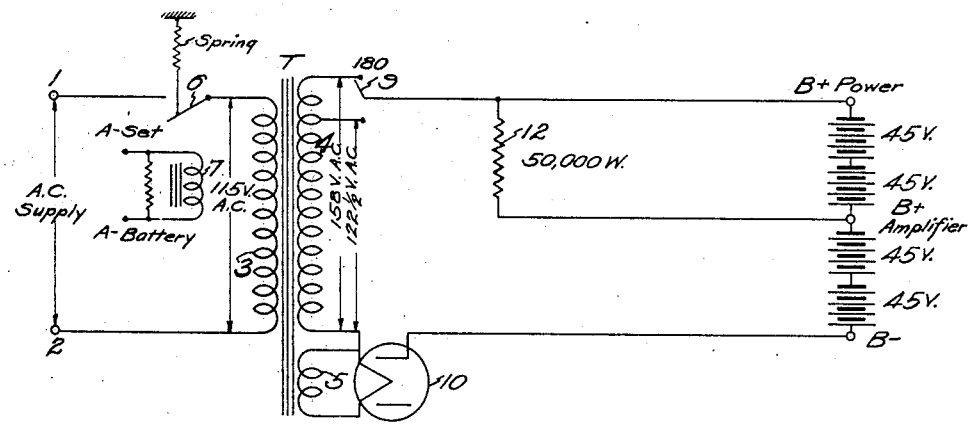

Figure 1 shows one arrangement of my invention as applied to charging dry cells supplying filament current to a radio receiving set. Figure 2 is an arrangement for charging dry cell "B"-batteries of a radio receiving set.

Referring to Figure 1, the input terminals 1 and 2 may be arranged for connection to a commercial alternating current source. A transformer T is provided with a primary winding 3 and a secondary winding or windings 4 for supplying the charging potential. A suitable rectifying device is arranged in circuit with the winding 4 in order to rectify the current which is to be used for charging the batteries. Either single-wave or double-wave rectification may be employed and the rectifier may be of either the electrolytic or the vacuum or gas tube types. In case a hot cathode rectifier is employed, another secondary winding 5 may be arranged to supply heating current to the cathode or cathodes as shown. In the arrangement of Figure 1 two hot cathode rectifying tubes $R_1$ and $R_2$ are employed, providing double-wave rectification. A rheostat RH is connected in series in the positive lead from the rectifier, and one or more choke cells $L_1$ and $L_2$, with bridged filtering elements consisting of dry cells, 6, are provided to eliminate fluctuations in the rectified current. The dry cell batteries may consist of, say, three or more standard dry cells. An ammeter may be connected in series with the batteries in order that the rheostat may be adjusted so that during set operation a condition is approached under which the batteries are under neither charge nor discharge. A switch or relay, S, may be provided in order to disconnect the batteries from the power supply circuit when the radio set is not in use and to connect it to the power supply circuit when the radio set is in use. A relay consisting of a switch controlled by an electromagnet working against a spring, gravity, etc., is preferably used, or a manually operated switch may be provided.

The transformer T is designed and proportioned so as to operate at or above its saturation point, under the load conditions under which it is intended to operate. This may be accomplished by employing a core of suitably limited cross-section, or in other known ways. This construction of the transformer tends to suppress the effect upon the rectifier and load circuit of variations in the supply voltage. For example, if there is a moderate increase in the impressed voltage, the corresponding increase in current is abnormally large and the resulting reactance and resistance drop are also abnormally large, tending to suppress the effect of the voltage fluctuation on the rectifier and filter circuits supplied by the transformer. That is, when the transformer is operated above its point of saturation, it is necessary for a large amount of magnetizing current to flow through the primary windings in order to increase the counter-electromotive force of the transformer until its value is equal to that of the impressed electromotive force minus the IR drop in the primary winding. The IR drop is correspondingly high, and the increase in net voltage impressed upon the rectifier and filter circuits is lower than if there were no abnormal increase in magnetizing current.

Moreover, this arrangement of the transformer has a tendency to suppress over-charging of the batteries more than undercharging, when the normal value of the impressed voltage is such that the transformer is operated at or above its saturation point, since any increase in impressed voltage then results in a considerable increase in magnetizing current, while a decrease in the impressed voltage results in a smaller decrease in magnetizing current.

Figure 2 shows an arrangement in which my invention is applied to a charging system for dry-cell "B"-batteries. The arrangement and operation of the transformer T may be the same as that described before, primary winding 3 being adapted for connection to an alternating current source at 1—2, and secondary winding 4 being proportioned and arranged to supply charging potential. The rectifying device is preferably constituted by a low-impedance vacuum tube 10, which may be either a standard rectifying tube (say of the types commercially known as 380, 313, 280, 213, etc.) or a three element tube in which the grid and plate elements are connected together. The cathode of the rectifying tube may conveniently be heated by current derived from the secondary winding 5. A switch, 6, may be arranged so as to be opened by means of an electromagnet 7, when the filament current is turned on, and closed by a spring Sp. or otherwise when the filament current is turned off. A manually controlled switch may be employed in lieu of the above arrangement. The arrangement here shown includes four 45 volt "B"-batteries, giving a total of 180 volts. In some cases it may be preferred to employ only 135 volts of "B"-battery, and a switch 9 is provided in order to give the proper charging voltage for this case. A resistance 12 may be arranged to supply a differential charge for the batteries having a lighter current drain, and may suitably have a value of about 50,000 ohms when 180 volts of "B"-battery are used.

In this circuit arrangement the transformer is preferably so proportioned that the charging potential is approximately equal to the counter voltage of the charged battery, whereby further charging of the battery substantially ceases when its potential rises on charge to a predetermined value. The circuit arrangement of Figure 2 is described and claimed in the copending application of Newcomb K. Chaney, and Frederick T. Bowditch, Ser. No. 214,952 filed August 23, 1927. As regards this circuit my invention relates more especially to the novel feature of designing and proportioning the transformer so as to operate at or above its saturation point, whereby the above described advantages are obtained.

From the foregoing description it will have appeared that my invention is equally applicable to systems in which the batteries are charged while the set or other load is in use, the batteries in effect floating on the line (as in Fig. 1), and to systems in which the batteries are charged while the set or load is not connected to them and are disconnected from the charging source when the set or load is connected to them (as in Fig. 2). It must be further understood that the foregoing circuits are merely specific examples of the application of my invention; and that my invention may be equally well applied to many similar circuits or variations of the foregoing circuits.

I claim:

A charging system for a dry cell battery comprising, in combination, a transformer provided with a primary winding adapted to be connected to a source of alternating current and with a secondary winding adapted to furnish a battery-charging potential, a rectifying device connected in circuit with said secondary winding, and means adapted for connecting in the secondary circuit the battery to be charged, said transformer being so designed and proportion as to operate at or above its saturation point under the intended load conditions, whereby the effects of voltage fluctuations in a supply source connected to said primary winding tend to be reduced or suppressed.

In testimony whereof, I affix my signature.

CHARLES A. WRIGHT.